United States Patent
Kimura

(10) Patent No.: US 6,970,566 B1
(45) Date of Patent: Nov. 29, 2005

(54) NETWORK SYSTEM AND METHOD FOR SECURE COMMUNICATION SERVICE

(75) Inventor: Misao Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/435,803

(22) Filed: Nov. 8, 1999

(30) Foreign Application Priority Data

Feb. 18, 1999 (JP) .................................. 11-039995

(51) Int. Cl.$^7$ .............................. H04L 9/00; H04K 1/00
(52) U.S. Cl. ...................... 380/282; 380/255; 380/281
(58) Field of Search .......................... 380/44, 273, 247, 380/281, 283, 286, 282; 713/171, 181, 170, 713/180, 152; 709/230, 237, 203

(56) References Cited

U.S. PATENT DOCUMENTS

| | | | |
|---|---|---|---|
| 5,124,117 A * | 6/1992 | Tatebayashi et al. | 380/281 |
| 5,239,294 A * | 8/1993 | Flanders et al. | 340/5.74 |
| 5,351,293 A * | 9/1994 | Michener et al. | 713/171 |
| 5,402,490 A * | 3/1995 | Mihm, Jr. | 380/247 |
| 5,410,602 A * | 4/1995 | Finkelstein et al. | 380/281 |
| 5,509,054 A * | 4/1996 | Garland | 379/106.09 |
| 5,689,563 A * | 11/1997 | Brown et al. | 380/247 |
| 5,724,426 A * | 3/1998 | Rosenow et al. | 713/167 |
| 5,838,792 A * | 11/1998 | Ganesan | 380/282 |
| 5,901,284 A * | 5/1999 | Hamdy-Swink | 713/200 |
| 5,903,649 A * | 5/1999 | Schwenk | 713/180 |
| 5,956,403 A * | 9/1999 | Lipner et al. | 713/181 |
| 5,960,086 A * | 9/1999 | Atalla | 380/44 |
| 6,026,163 A * | 2/2000 | Micali | 705/80 |
| 6,067,546 A * | 5/2000 | Lund | 707/10 |
| 6,088,449 A * | 7/2000 | Atalla | 380/273 |
| 6,118,993 A * | 9/2000 | Patel | 455/411 |
| 6,154,543 A * | 11/2000 | Baltzley | 380/255 |
| 6,253,322 B1 * | 6/2001 | Susaki et al. | 713/170 |
| 6,584,563 B1 * | 6/2003 | Kikuchi et al. | 713/152 |
| 6,711,264 B1 * | 3/2004 | Matsumoto et al. | 380/283 |
| 6,775,382 B1 * | 8/2004 | Al-Salqan | 380/286 |

FOREIGN PATENT DOCUMENTS

| | | | |
|---|---|---|---|
| JP | 60-176355 | 9/1985 | |
| JP | 61-294563 | 12/1986 | |
| JP | 2-82836 | 3/1990 | |
| JP | 2000-134193 | * 10/1998 | ............. H04L 9/08 |

OTHER PUBLICATIONS

CCS#7 Networks Dependability Studies: Phase 2. Jun. 1998. p. 1-37.*
Buckles, Cheryl. SS7 Gateways serve and protect. Nov. 20, 1989. Telephony. p. 1-5.*
Access Points on Narrowband Data Circuits in Modern Carrier Environments. Oct. 1997. p. 1-6.*

* cited by examiner

Primary Examiner—Ayaz Sheikh
Assistant Examiner—Christian La Forgia
(74) Attorney, Agent, or Firm—Katten Muchin Rosenman LLP

(57) ABSTRACT

A network system providing secure service facility has a central control & management equipment to enable unified key management. The network includes a plurality of switching equipment and central control & management equipment, each of which includes encryption section. The encryption section of central management & control equipment encrypts; (a) a public key of switching equipment of a called party (i.e. terminating switching equipment); and, (b) a common key for encrypting message to be transferred between switching equipment. This is carried out each time a call requesting secure communication is originated. Then, the encrypted keys are delivered to the switching equipment of a calling party (i.e. originating switching equipment). Central management & control equipment maintains public keys of any switching equipment in a database.

4 Claims, 7 Drawing Sheets

Terminal Encrypting Method

Line Encrypting Method

NETWORK SYSTEM AND METHOD FOR SECURE COMMUNICATION SERVICE

FIELD OF THE INVENTION

The present invention relates to a network system having a secure service facility and, more particularly, to a network system including central management and control equipment in a central office and a plurality of switching equipment to improve communication confidentiality by the use of encryption keys prepared in an encryption section of switching equipment at each time of call establishment.

BACKGROUND OF THE INVENTION

As the network infrastructure for information transfer improves, the importance of security is reviewed and recognized. Today, networks for transferring information are essential for daily life because networks can reduce temporal and spatial restrictions either in business or in private life.

However, the way of handling information differs depending on the intention of a person who originates the information. Sometimes, messages regarded important by outside people are handled imprudently. In a private network such as an intra-company network, lines leased from telecommunications operating agencies are usually used.

This means the information is transferred through a public region. At present, however, adequate measures are not always taken against illegal actions such as wiretapping. One reason is that intra-company communications are originally based on connections between extension lines within a company.

Considering such situation, various encryption technologies for secure communication have been developed to cope with illegal wiretapping, unauthorized alteration etc. to information content to be transferred through a network. An outline of a secure communication is explained in FIG. 8.

In the case of (I) shown in FIG. 8, data to be sent from an originating party Ti to a receiving party T2 is assumed to be maintained in the same format as in the original message (i.e. plaintext). According to this method, wiretapping or alteration can be easily conducted at T3 on transmission.

On the other hand, in the case of (II) in FIG. 8, data is transmitted after the data has been encrypted using an encryption key (A) at originating party Ti. At receiving party T2, the encrypted data is restored to the plaintext using a decryption key. Decryption is required to restore the data to plaintext, and either wiretapping or alteration of the data being transmitted is difficult.

With regard to the method of encryption, the following two methods are known. The first method is a common-key encryption method in which an encryption key (A) and a decryption key (B) are identical; and the second method is a public-key encryption method in which the key (B) differs from the key (A).

In the common-key encryption method encryption and decryption are carried out using the same key at originating party Ti and receiving party T2 respectively. The public-key encryption method, represented by the RSA encryption method, is such that encryption is performed using a public key and decryption is performed using a private key, to which a one-way function is applied.

The common-key encryption method is used for encrypting a message itself because high speed processing is possible. On the other hand, the public-key encryption method is not oriented for high speed processing, while it may easily be installed by software. Therefore, the public-key encryption method is mainly applied to key delivery to perform the common-key encryption method.

As for methods of practical encryption by the use of an encryption key, the following two methods are known: a block encryption method represented by DES, and a stream encryption method by using a random number on a bit-by-bit basis.

Among examples of present communication systems, a terminal encrypting method and a line encrypting method are known. According to the terminal encrypting method, encryption is performed at each terminal point using security equipment 100 provided in each terminal, as shown in FIG. 9. In the line encrypting method as shown in FIG. 10, security equipment 100 is provided in TDM equipment, and encryption is performed on a line-by-line basis.

In the terminal encrypting method in FIG. 9, it is assumed that receiving parties are different on each call. (Apparently, security equipment 100 of identical design is required for both originating party and receiving party.) After a call is connected, an encryption key (or a decryption key for a receiving party) is transferred between security equipment located with each party, using the public-key encryption method. Thus, the public key is shared between the originating party and the receiving party.

On the other hand, in the line encrypting method, encryption is carried out between, for example, TDM (multiplexing) equipment 101 at the guaranteed transmission rate (e.g. 1.544 Mbps) as shown in FIG. 10. Such a system is realized by using the stream encryption method, which enables simple and high-speed processing. However, when lines include a cross connect, security equipment 100 is required line-by-line. A key management function is also required.

Current secure systems have been generally realized by combining methods described above. One example is shown in FIG. 11. After a call is connected between a terminal A and a terminal B, a common key for encrypting messages is generated in security equipment 100 at terminal A (step S1). In order to transfer the common key to terminal B, the common key is encrypted using the public key of terminal B and is transmitted (step S2).

Terminal B decrypts received encrypted data using the private key of terminal B itself (step S3). Thus the common key is shared between terminals A and B. Accordingly, using the common key shared between the terminals, messages are encrypted in security equipment 100 at terminal A and the secure communication is started.

Recently, in the field of economic activities related to electronic commerce, the Internet etc., measures for individual authentication, security and so on have been applied. However, a mechanism to enable secure communication between any parties at any time and place has not been provided yet. A system is desired with such functioning.

Presently, as mentioned above, security equipment 100 must basically be implemented line by line where secure communication is required. In addition, secure communication between any party is not possible using only security equipment 100 which has already been installed. Secure communication with newly added parties requires the installation of security equipment 100 at additional cost.

Further, in order to provide security to the maximum extent, a key management function becomes essential. It is complicated for network users to share keys for performing the aforementioned public-key encryption method. This requires maintaining keys by a unified system. Under such an integrated key management, the object to be managed may be restricted.

The present invention provides a network system having a secure service function to solve the above-mentioned problems.

SUMMARY OF THE INVENTION

It is an object of the invention to provide a network system particularly in a private network having a secure service facility which may not require users' intervention.

It is a further object of the invention to provide a network system having secure service which can improve confidentiality by applying the secure service facility independently for specified users without system modification.

It is a still further object of the invention to provide a network system having the secure service facility wherein central management and control equipment is provided to conduct a unified key management function.

According to the present invention, a network system having a secure communication service facility to solve the aforementioned problems includes central management and control equipment and a plurality of switching equipment, either of which further includes an encryption section. When a call requesting secure communication is originated, central management and control equipment encrypts in an encryption section (a) a public key of switching equipment accommodating a called party; and (b) a common key to encrypt a message to be transmitted between switching equipment related to the message communication. These keys are delivered to the switching equipment detecting an originated call at each time a call requesting secure communication is originated.

According to one aspect of the invention, central management and control equipment maintains public keys of a plurality of switching equipment in a database. Central management and control equipment receives a dial number of a called party and a user identification number from the switching equipment detecting the call. Central management and control equipment then retrieves from its own database (a) a public key of the switching equipment accommodating the called dial number; and (b) a public key of the switching equipment detecting the originated call. For this purpose, the called dial number and the user identification number assigned in the switching equipment detecting the call are used respectively. Then, central management and control equipment generates a common key from the retrieved public key of the switching equipment accommodating the called party and a public key of the switching equipment detecting the originated call.

According to another aspect of the invention, switching equipment detecting an originated call encrypts a common key received from central management and control equipment using a public key of switching equipment accommodating a called party, to forward to the switching equipment accommodating the called party. Then, the switching equipment accommodating the called party decrypts the encrypted common key using its own private key.

According to another aspect of the invention, switching equipment detecting an originated call is controlled so as to transit to the secure communication mode each time a call is originated.

According to still another aspect of the invention, switching equipment detecting an originated call is controlled so as to transit to the secure communication mode at the time of detecting information in the call which requests a transit to the secure communication mode.

As described above, central management and control equipment in a central office which performs unified key management and operation is individually connected to each of a plurality of switching equipment through a common channel signaling network. The keys may be delivered at a desired time. Key delivery corresponding to each called party on a call-by-call basis enables central management and control equipment to manage and control suitable conditions for the encryption.

The above other features of the invention will become apparent in the lowing description of the embodiments of the invention and the accompanying drawings.

DESCRIPTION OF THE PREFERRED EMBODIMENTS

Figure 1:
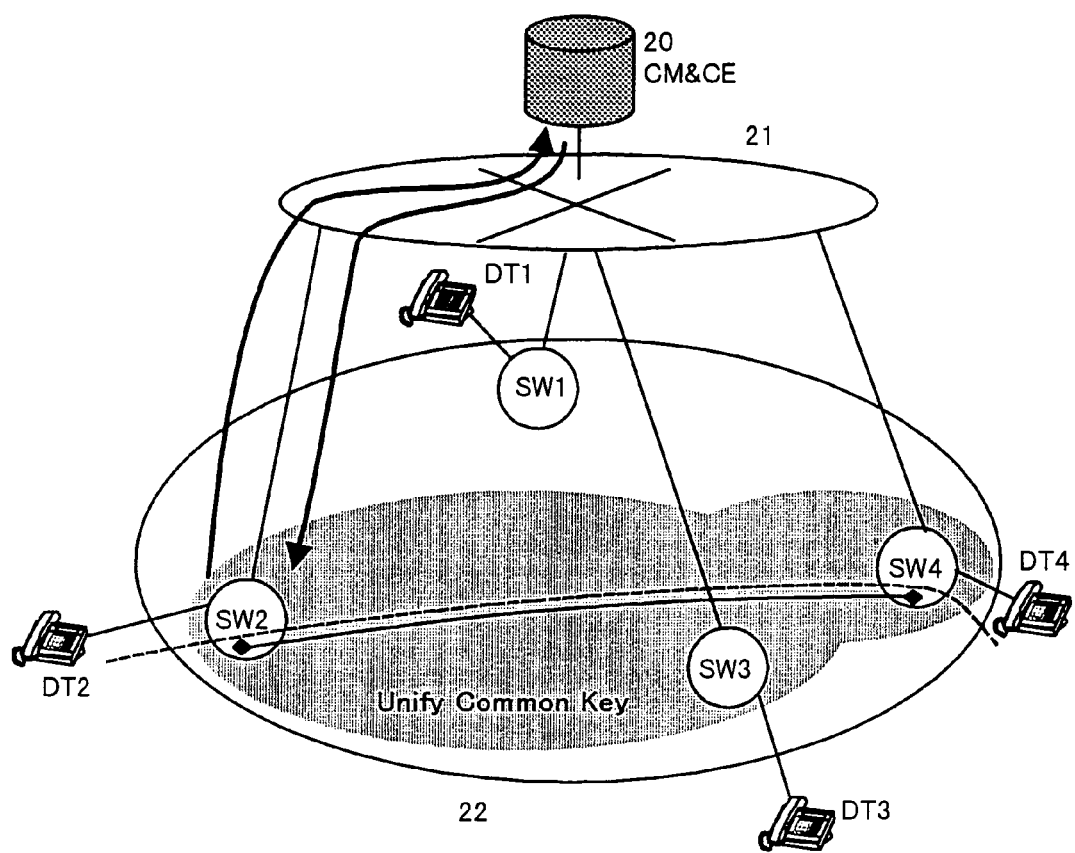
FIG. 1 shows the principle of a secure service facility in a network system in accordance with the present invention.

FIG. 1 shows the principle of a secure communication facility of a network system in accordance with the present invention. In FIG. 1, a circuit switched public network 22 includes a plurality of pieces of switching equipment SW1–SW4.

Subscriber terminals DT are connected to switching equipment SW1–SW4 respectively. Each piece of switching equipment SW1–SW4 is individually connected through a signaling network 21 such as a No. 7 common channel signaling network to a central office in which unified key management operation is performed.

The central office includes central management and control equipment 20. Each piece of switching equipment has a security section. Central management and control equipment 20 and each piece of switching equipment constitute a network, which is independent of circuit switched public network 22, enabling the delivery of keys at a desired time. In FIG. 1, for example, when a call is originated from data terminal DT2, switching equipment SW2 transmits information related to a called party DT1 to central management and control equipment 20.

Then, central management and control equipment 20 retrieves from a database and transmits to a piece of switching equipment SW2 a retrieved public key related to the called party and a common-key information. Switching equipment SW2 encrypts the common-key information using the public key related to the called party and transmits the encrypted information to a piece of switching equipment SW4 which accommodates the called party. Switching equipment SW4 may obtain the common key by decrypting the received information using the private key of switching equipment SW4.

Thus, message information may be encrypted and transferred between switching equipment SW2 and SW4 using the common key.

Accordingly, in the present invention, encryption keys may be delivered at any desired time through the individual connection between any of the pieces of switching equipment and a central office in which the unified key management operation is performed. This enables not only an integrated key management function that has been performed independently in conventional systems, but also facilitates key modification when desired for delivery to related equipment. Thus, enhanced flexibility and expandability of the overall network can be obtained.

In addition, by using the above-mentioned encryption method on a call-by-call basis, a secure communication function is carried out at a point within network nodes, compared to a line encryption method. This makes either illegal wiretapping or alteration to messages difficult. In private networks, switching equipment and subscribers connected to the switching equipment are generally located within the same firm. It is therefore mainly between a plurality of pieces of switching equipment that a secure communication function is required.

Figure 2:
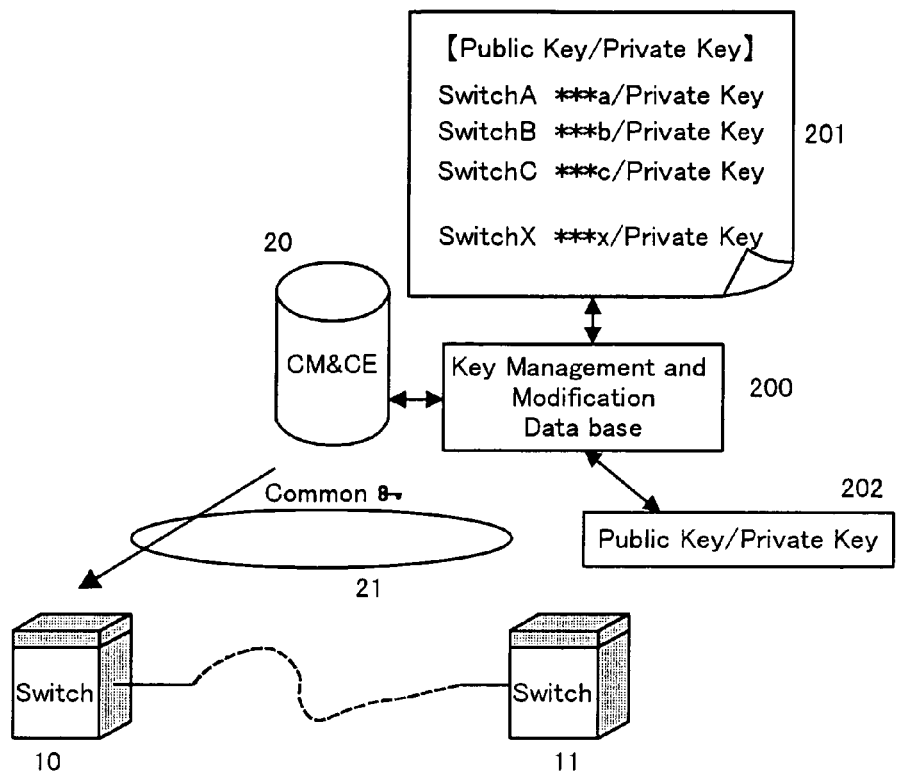
FIG. 2 shows a database provided in central management and control equipment 20 of a central office.

Referring to FIG. 2, a database is provided in central management and control equipment 20 located in a central office. Central management and control equipment 20 provides key management and modification functions 200 based on database 201. In database 201, public keys and private keys corresponding to each piece of switching equipment A–X are registered. A public key is used for encrypting data for transmission, which is open to each other piece of switching equipment.

On the other hand, a private key is to be used in pieces of switching equipment for decrypting data which has been encrypted and transmitted from other pieces of switching equipment. In FIG. 2, public keys and private keys given to the central office are registered in a database 202. The public keys and the private keys are used when information is transferred between the central office, which includes central management and control equipment 20, and each piece of switching equipment.

Figure 3:
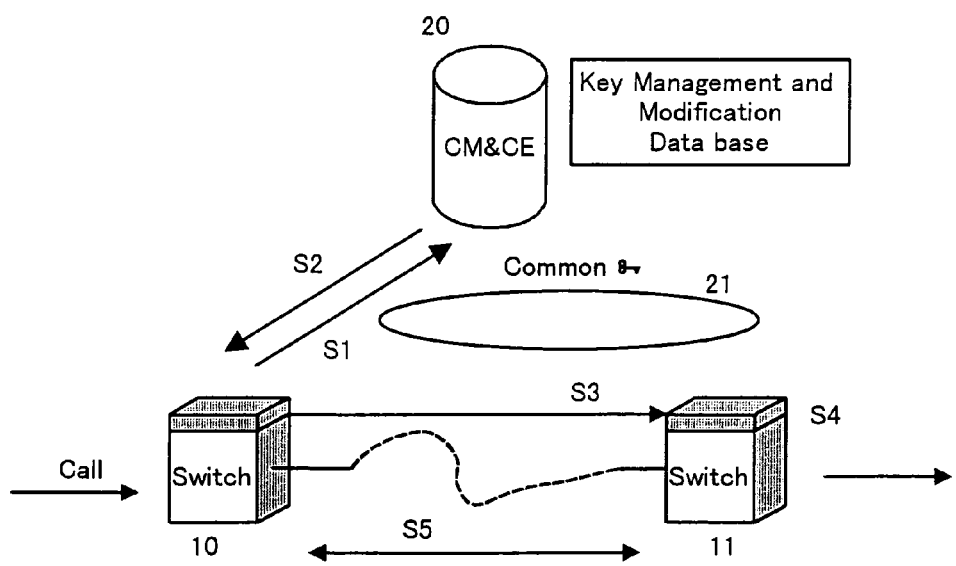
FIG. 3 shows a procedure for key delivery.

Referring to FIG. 3, a procedure for key delivery is shown. In FIG. 3, it is assumed for explanation that, in a network which includes a plurality of pieces of switching equipment, a call is originated from a subscriber accommodated by a piece of switching equipment 10 to a subscriber accommodated by a piece of switching equipment 11.

When a call is originated from a calling party, the communication mode of niece of switching equipment 10 is shifted to the secure communication mode (i.e. the automatic secure communication mode). It may also be possible, however, that a calling party sends a distinctive number corresponding to the secure service prior to an originating number, which causes a shift to the secure communication mode (i.e. the individual secure communication mode).

In the latter case, switching equipment 10 is shifted to the secure service mode when a distinctive number (i.e. a predetermined number assigned to the secure) service mode) is identified from the dialed information.

In FIG. 3, switching equipment 10 having been shifted to the secure service mode encrypts both the called number of the called party and the user identification number in the switching equipment. This operation is performed using a public key 202 of central management and control equipment 20, which is open throughout the network in advance. The encrypted information is then transferred to central management and control equipment 20 through No. 7 common channel signaling network 21 (step S1).

In central management and control equipment 20, encrypted data transmitted from switching equipment 10 is decrypted using the private key 202 of central management and control equipment 20. Thus, the called number of the called party and the user identification number of switching equipment 10 are recognized.

Then, central management and control equipment 20 obtains the public key (e.g. ***b refer to database 201) of switching equipment 11 in which the called party's called number is maintained (i.e. through which the called party is accommodated) by retrieving it in database 201 according to the called number. Furthermore, central management and control equipment 20 encrypts, and then transmits, the obtained public key of switching equipment 11 and a common key to be used in switching equipment 10 and 11 (step S2).

Then, switching equipment 10 decrypts the encrypted data sent from central management and control equipment 20 using the private key of switching equipment 10. Thus switching equipment 10 can recognize the public key of switching equipment 11 and the common key. Furthermore, switching equipment 10 encrypts the decrypted common key using the public key of switching equipment 11 to transmit to switching equipment 11.

Figure 4:
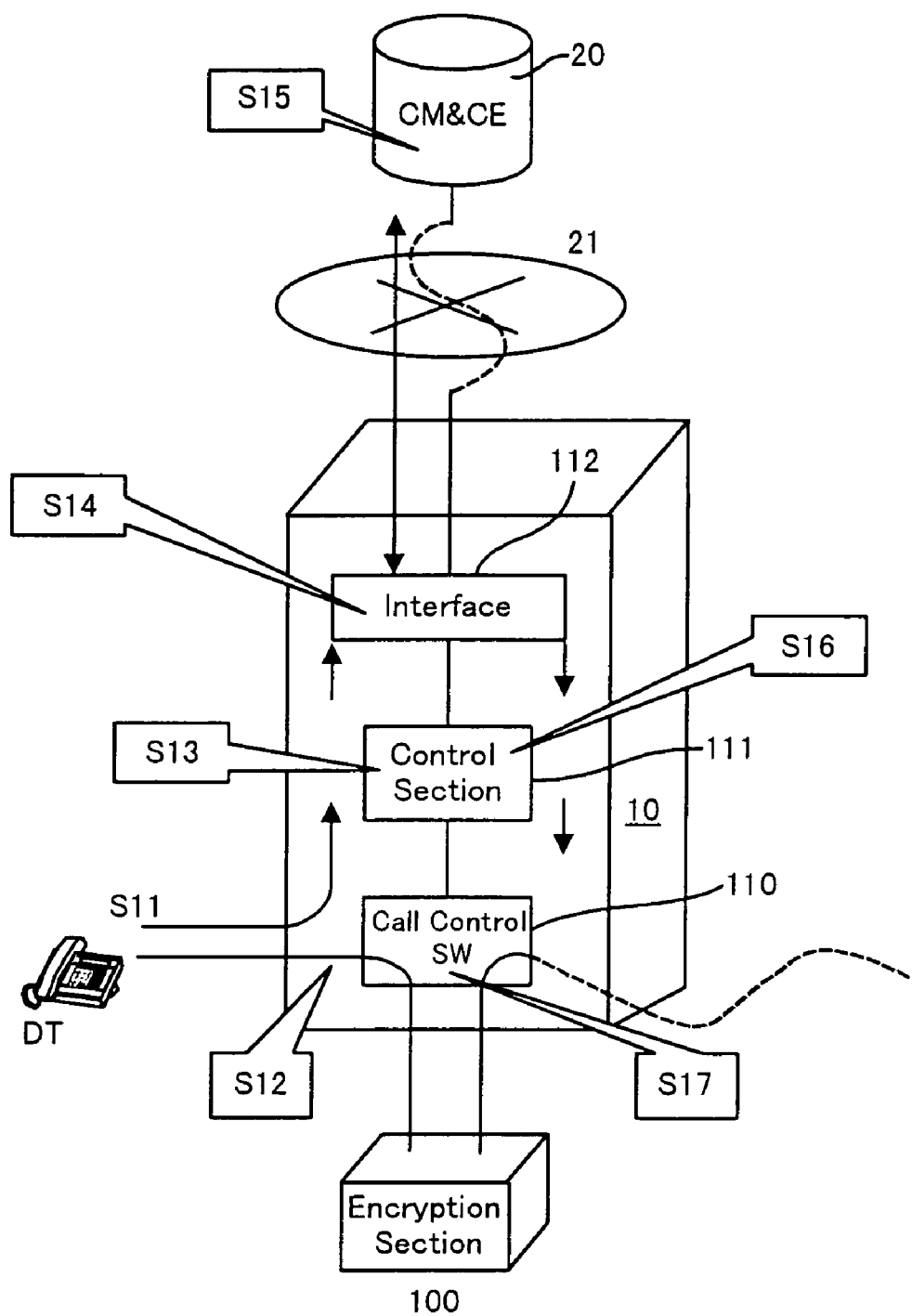
FIG. 4 further shows a flow of the aforementioned procedure in switching equipment 10.

Referring to FIG. 4, the above-mentioned process in switching equipment 10 is explained in more detail. Switching equipment 10, when processing a call request from the subscriber terminal DT, transmits the secure service request together with the dial number of the called party (step S11). This secure service request is detected by call control switch 110 of switching equipment 10 (step S12).

Then, control section 111 performs processing for managing the call, extracting the called party number, deciding applicability of the secure service for the relevant subscriber, preparing a dialogue data for the central office and so on (step S13). The dialogue data prepared in control section 111 is then transmitted through interface 112 to central management and control equipment 20 via common channel signaling network 21 (step S14).

As mentioned above, central management and control equipment 20 decides whether secure service is allowed for the related terminal using a subscriber data (not shown). Then, also as mentioned above, central management and control equipment 20 performs functions such as key management, retrieval and selection of applicable mode according to database 201 (refer to FIG. 2) (step S15).

Furthermore, in switching equipment 10, control section 111 requests central management and control equipment 20 to update the encryption keys, etc., and also issues a connection start order and secure communication start order to call control switch 110 (step S16). On receipt of the secure communication start order, call control switch 110 connects encryption section 100 with sending information (step S17).

Encryption section 100 encrypts the sending information connected by call control switch 110 using the public key. Encryption section 100 also has a decryption function to decrypt encrypted information using a private key.

Referring back to FIG. 3, switching equipment 11 decrypts the received encrypted information using the private key of the switching equipment 11. Thus, the common key may be recognized in switching equipment 11.

At this time, sharing the common key for secure communication has been realized between switching equipment 10 and 11 (more precisely, between encryption sections 100 in each switching equipment). Then, when preparation of the common key is completed in encryption section 100 of switching equipment 11, return information is transmitted back to encryption section 100 of switching equipment 10.

Meanwhile, it may also be possible to send an announcement message or another special signal to the related terminals in switching equipment 10 and 11 to indicate that the secure service process is being performed. After the synchronization is completed between each encryption section of the relevant switching equipment, the secure message communication is started.

In encryption section 100 of switching equipment 10, encryption is executed using the common key already shared with the encryption section of switching equipment 11. An encryptor is provided which employs an encryption scheme such as DES, Triple DES etc. in encryption section 100. The encrypted data is then transmitted.

In encryption section 100 of switching equipment 11, the received encrypted data is decrypted using the common key by the reverse procedure of the encryption process in encryption section 100 of switching equipment 10. Then, the decrypted message is forwarded to the terminal accommodated by switching equipment 11. A message originated by a terminal in switching equipment 11 may be processed similarly but in the opposite direction to the above-mentioned procedure.

Figure 5:
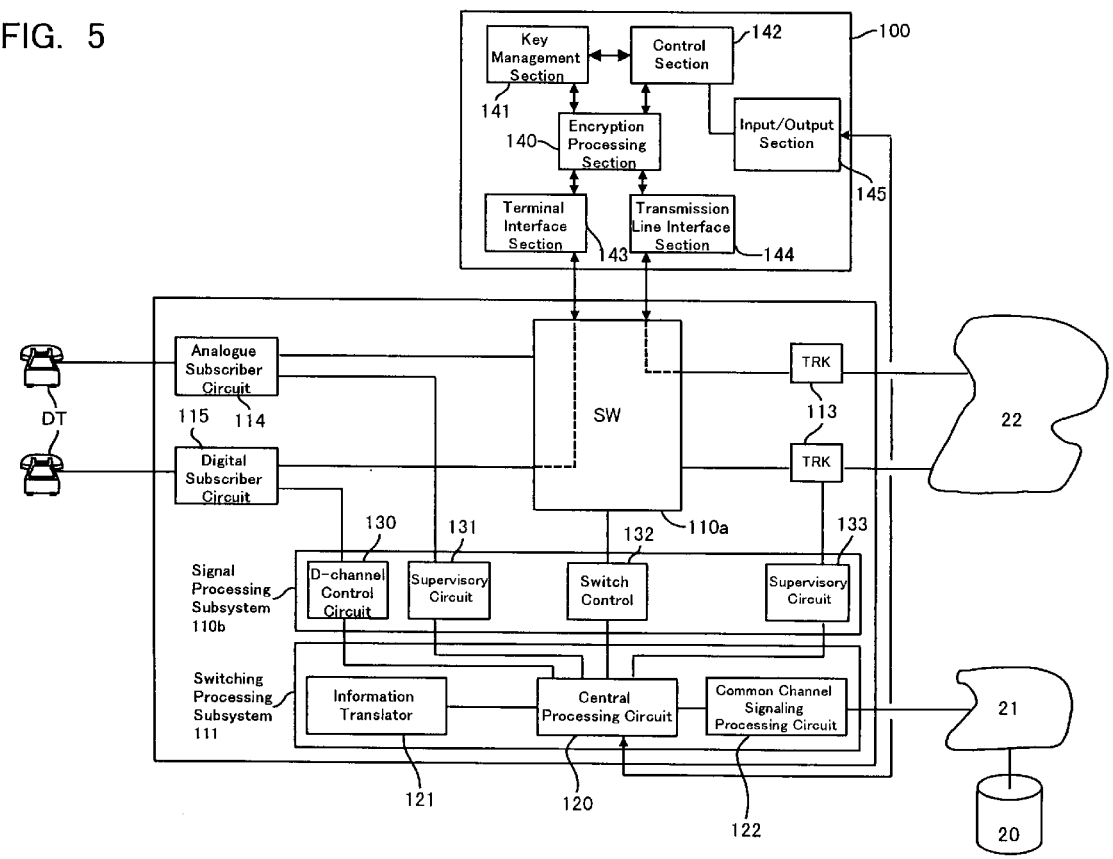
FIG. 5 shows an example of the overall system configuration mainly explaining the functional block diagram of the switching equipment to which encryption section 100 is attached.
Figure 6:
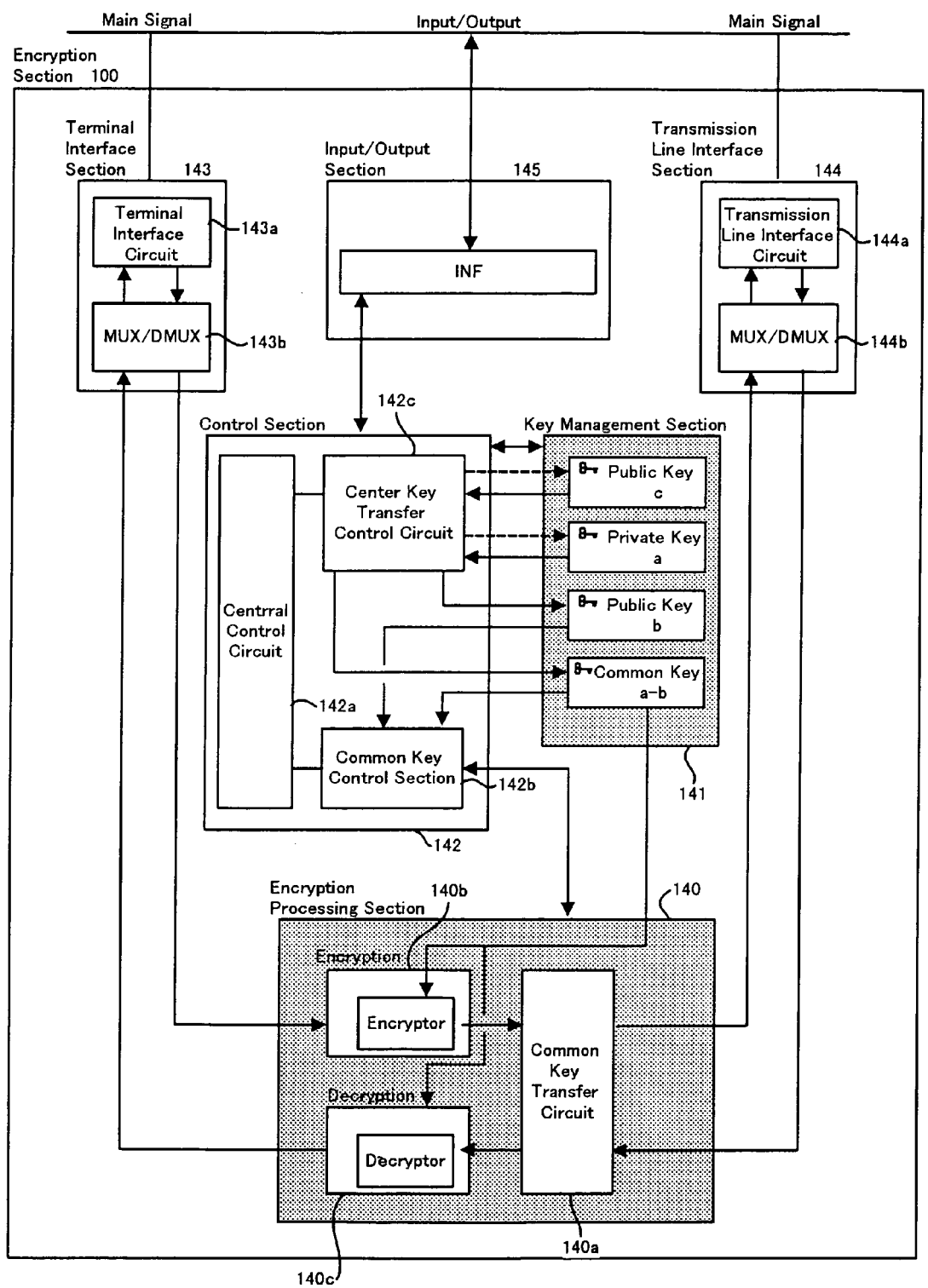
FIG. 6 shows one embodiment of encryption section 100.

Referring to FIG. 5, a preferred embodiment of the system configuration is illustrated, where the functional block of switching equipment attached to encryption section 100 is mainly explained. In FIG. 6, a preferred block diagram of encryption section 100 is illustrated. A functional block of switching equipment 10 is explained hereafter referring to FIG. 5, which is common to each of the pieces of switching equipment.

Switching equipment 10 also includes call control switch 110 which further includes switch 110*a* and signal processing subsystem 110*b*. In addition, switching equipment 10 has a trunk 113 having an interface with a circuit switched network 22. Switching processing subsystem 111 includes a central processing circuit 120, an information translator 121, and a common channel signaling circuit 122 connected to a common channel signaling network 21.

Overall control is performed by the central processing circuit 120 in switching the processing subsystem 111 referring to the information translator 121. Control signals to/from equipment connected to the common channel signaling network 21 are transferred by the central processing circuit 120 through the common channel signaling circuit 122.

Supervisory circuit 131 in signal processing subsystem 110*b* supervises output status of the trunk 113 connected to a circuit switched network 22. Switch controller 132 controls the route selection function of switch 110*a* under the control of central processing circuit 120.

D-channel control circuit 130 supervises digital subscriber circuit 115 to determine the D-channel status of a terminal DT. Supervisory circuit 131 supervises analog subscriber circuit 114 to detect origination of a call. On detecting an originated call, D-channel control circuit 130 and supervisory circuit 131 inform central processing circuit 120 of a called number.

As explained later in FIG. 6, central processing circuit 120 encrypts the called number and the user identification number of the originating switching equipment in encryption section 100 using the public key of central management and control equipment 20. This encrypted data is then transmitted to central management and control equipment 20 through common channel signaling network 21 via common channel signaling processing circuit 122.

Upon receipt of a common key from central management and control equipment 20, the central processing circuit 120 controls the switch controller 132 to select a route in switch 110*a*. The message information encrypted by encryption section 100 using the common key is then transmitted to circuit switched network 22 through trunk 113 on the selected route of switch 110*a*.

Referring to FIG. 6, there is shown a preferred embodiment of encryption section 100, which encrypts outputs of analog subscriber circuit 114 and digital subscriber circuit 115 and decrypts an output of trunk 113 in the opposite way.

In the encryption section 100 shown in FIG. 6, terminal interface section 143 includes terminal interface circuit 143*a* and multiplexing/demultiplexing circuit 143*b*. An interfacing function between the analog subscriber circuit 114 and the digital subscriber circuit 115 is carried out for data transfer through switch 110*a*.

Transmission line interface section 144 includes transmission line interface circuit 144*a* and multiplexing/demultiplexing circuit 144*b*, having an interfacing function with trunk 113 to transfer data through switch 110*a*.

Input/output section 145 provides an interface function between central processing circuit 120 of switching processing subsystem 111 in switching equipment 10 and control section 142. Encryption section 100 persistently maintains the public key (c) of central management and control equipment 20 and the private key (a) of the switching equipment (here, switching equipment 10) in key management section 141. As already illustrated in FIG. 1 to FIG. 3, the private key (a) is used for the reception of the public key (b) of the called switching equipment (for example, switching equipment 11) and the common key (a–b) for encrypting/decrypting a main signal. (i.e. message information etc.) The reception is carried out on a call-by-call basis from central management and control equipment 20.

When a call occurs from an originating party, switching equipment 10 automatically shifts the communication mode to perform secure communication. Alternatively, it may also be possible that an originating party intentionally requests secure communication by adding a distinctive number specified for the secure service prior to the originating number.

In this case, detecting a distinctive number (a specified number for the secure service) in dialed information, switching equipment 10 recognizes the request for secure service in D-channel control circuit 130 and in supervisory circuit 131 (refer to FIG. 5). Accordingly, the secure service is started under the control of central processing circuit 120 in switching equipment 10.

When the secure communication mode begins, the control is started by control section 1.42 of encryption section 200 and central processing circuit 120 of switching equipment 10. In switching equipment 10, the called dial number and the user identification number are encrypted in central office key transfer control circuit 142*c* of control section 142. This is carried out according to data of secure communication mode sent from central processing circuit 120, using the public key (c) of the central office. Then, central processing circuit 120 transmits the encrypted called number and user identification number to central management and control equipment 20, through common signaling channel network 21.

Central management and control equipment 20 decrypts the encrypted data sent from switching equipment 10 using the private key (c). Thus, the called number and the user identification number are recognized. Then, by searching database 201 (refer to FIG. 2) using the called number and the user identification number, the public key (b) of the switching equipment to which the destination terminal is connected (e.g. switching equipment 11) is obtained. Then, central management and control equipment 20 generates the common key (a–b) to encrypt the message actually being communicated between switching equipment 10 and switching equipment 11.

Using the public key (a) of switching equipment 10, central management and control equipment 20 further encrypts the common key (a–b) generated above and the public key (b) for communicating with switching equipment 11, to transmit to switching equipment 10.

Switching equipment 10 decrypts the encrypted data received from central management and control equipment 20 in central office key transfer control circuit 142c using the private key (a) of switching equipment 10. Accordingly, the public key (b) of switching equipment 11 and the common key (a–b) for the use of encrypting messages are obtained.

Switching equipment 10 selects a route in the switch via the switch control circuit by the control of central processing circuit 120, and performs connection processing in accordance with the called number. Meanwhile, upon completion of the connection, switching equipment 11 is shifted to the secure communication mode. At this point in time, the encryption section 100 of switching equipment 10 and the encryption section of switching equipment 11 are connected through common channel signaling network 21.

When the connection is completed, the common key (a–b) is encrypted in common key control section 142b of control section 142, using the public key (b) of switching equipment 11 already indicated from central management and control equipment 20. The encrypted common key (a–b) is then transmitted to the encryption section of switching equipment 11 by common key transfer circuit 140a in encryption processing section 140.

The encryption section of switching equipment 11 decrypts the received data using the private key (b) to regenerate the common key (a–b). At this point in time, sharing of the key for secure communication, i.e. the key (a–b), is achieved between both of the pieces of switching equipment (actually between the encryption sections in each switching equipment) which respectively accommodate the related terminal.

When the common key is prepared in the encryption section of switching equipment 11, the confirmation information is transmitted back to encryption section 100 of switching equipment 10.

However, it may also be possible to send an inserted announcement message to the related terminals so as to indicate that the secure communication processing is in progress. During this procedure, the current state may be confirmed between central control circuit 142a in control section 142 and central processing circuit 120 in switching processing subsystem 111.

At the time synchronization is completed between the encryption sections of switching equipment 10 and 11, the secure message communication is started. In encryption section 140 of switching equipment 10, the common key (a–b) shared with the encryption section of switching equipment 11 is transmitted to encryption processing section 140 from key management section 141 of encryption section 100. Encryptor 140b of encryption processing section 140 performs encryption using the aforementioned common key (a–b) by means of an encryption scheme such as DES Triple DES, and so on. The encrypted message is transmitted to circuit switched network 22 through transmission line interface section 144.

In the encryption section (more precisely, in a decryptor of the encryption processing section) of switching equipment 11, decryptor 14Cc decrypts the encrypted message already received using the common key (a–b). The above procedure is the reverse of the process performed by encryptor 140b in switching equipment 10. The decrypted message is forwarded to the terminal. A message sent from switching equipment 11 is encrypted using the common key (a–b) similar to the procedure performed in switching equipment 10, and is transmitted to switching equipment 10.

On completion of the call, control section 142 of encryption section 100 directs key management section 141 to discard both of the public key (b) and the common key (a–b), and discard processing is executed accordingly.

Furthermore, the modification of the database in key management section 141 may be possible by transferring the public key (c) of central management and control equipment 20 and the private key (a) of the switching equipment. This is a similar procedure to the aforementioned transmission/reception procedure to/from central management and control equipment 20. Use of the modification procedure produces not only easy key management but also enhanced confidentiality in the system.

Figure 7:
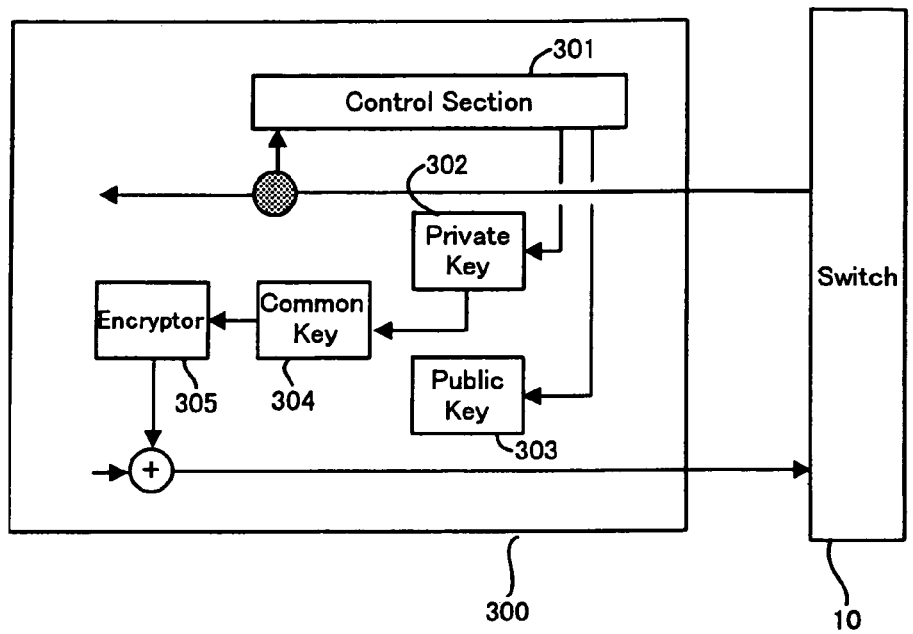
FIG. 7 shows another embodiment of the present invention.
Figure 8:
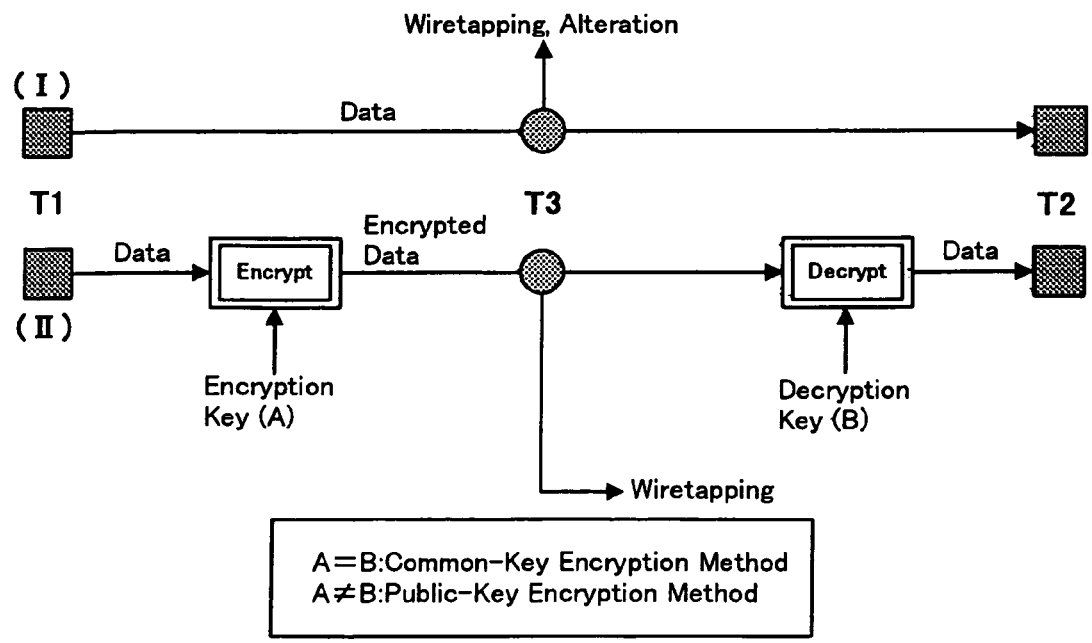
FIG. 8 shows an outline of secure communication.
Figure 9:
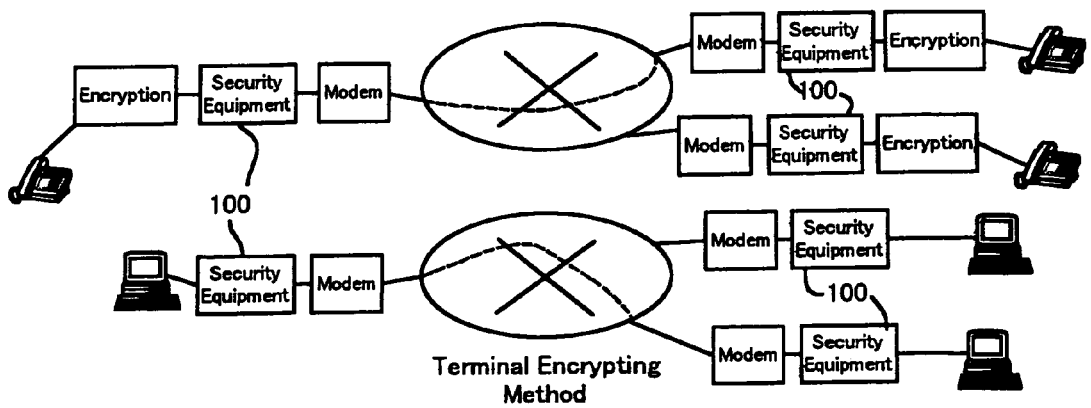
FIG. 9 shows a terminal encryption method.
Figure 10:
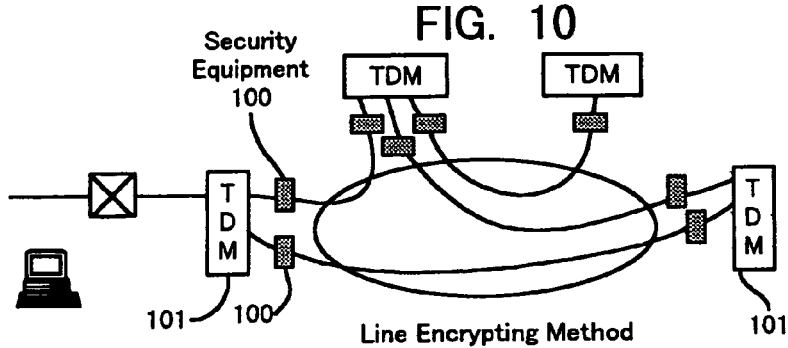
FIG. 10 shows a line encryption method.
Figure 11:
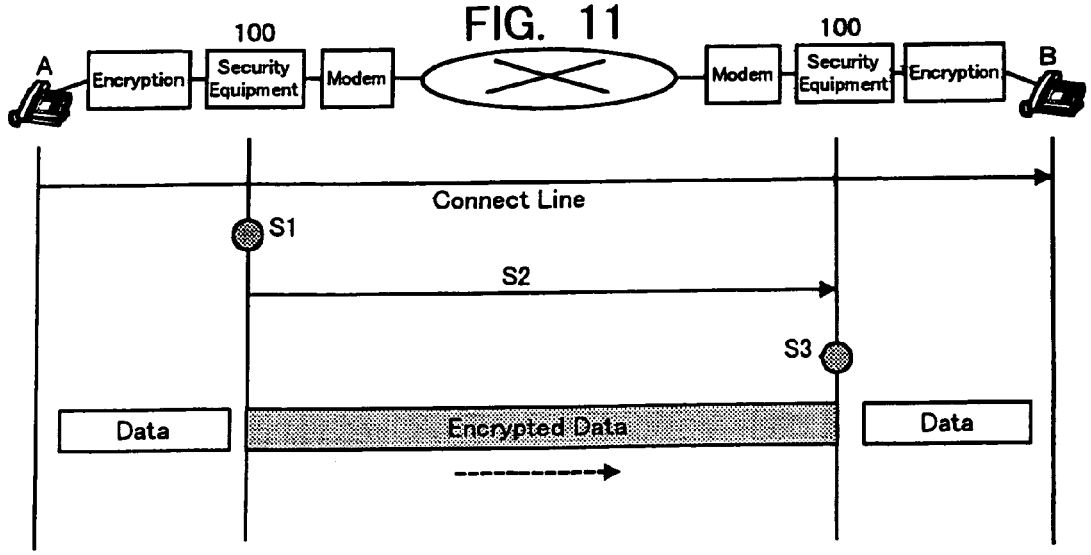
FIG. 11 shows an example of a conventional system having a secure communication facility.

FIG. 7 illustrates another preferred embodiment of the present invention. In order to improve the confidentiality, encryption and decryption are preferably carried out near to an originating point of information. From this viewpoint, it may be possible to provide security equipment in each terminal, as shown in FIG. 7.

As shown briefly in FIG. 7, a portion of the function in encryption section 100 illustrated in FIG. 6 may be provided in the individual terminal 300. In FIG. 7, the encryption/decryption function of terminal 300 is controlled by control section 301.

Terminal 300 provides a register for a public key 303 of the terminal 300 and a register for a private key 302 corresponding to public key 303. Using private key 302, common key 304 is regenerated by decrypting the encrypted data transmitted from central management and control equipment 20 in a central office.

Therefore, it is possible to encrypt a message to be forwarded to the destination terminal in encryptor 305 using the regenerated common key 304, and to transmit to switching equipment 10 where terminal 300 is connected.

In the embodiment illustrated in FIG. 7, the function of encryption section 100 in switching equipment 10 may be simplified to encrypt a destination terminal dial number and a user identification number of switching equipment 10, and then to inform central management and control equipment 20. This brings about simplified configuration of encryption section 100.

In accordance with the embodiment, the present invention enables performance of secure communication on a call-by-call basis without necessitating key management in subscribers' premises. The key may be altered (compulsively) each time of secure communication. Unified key management performed by a central office enables to the improvement of both maintainability and secrecy. In addition, keys for transferring data between a central office and a plurality of pieces of switching equipment in a network may be changed when desired, because a common channel signaling network is used as communication path.

According to the present invention, a private network can be constituted which enables a secure communication function not requiring users' intervention. This will bring not only enhanced security but also improved secure communication function individually applicable to the predetermined users without requiring system modification. Because the unified key management performed by the central management and control equipment, the management burden can be limited. Key modifications executable whenever desired improve the system security. In case of system extension, centralized control by the central management and control equipment can be realized. In addition, the combination of encryptors (the scrambling scheme) can be modified call by call.

Having described the invention in detail, it will be apparent that other modifications and variations are possible without departing from the scope of the invention defined in the claims.

What is claimed is:

1. A network system providing secure communication services, comprising:
    a plurality of pieces of switching equipment, being connected to each other through a public network, and accommodating data terminals; and
    central management and control equipment connected to the plurality of pieces of switching equipment through a separate network different from the public network,
    wherein the central management and control equipment includes a database storing a plurality of sets of a public key and a private key, each assigned to a piece of switching equipment,
    a first piece of switching equipment, accommodating a data terminal of a calling party, encrypts a dial number of a called party and a user number of the first piece of switching equipment by using a public key, which is used between the first piece of switching equipment and the central management and control equipment and transmits the encrypted dial number and user number to the central management and control equipment via the separate network,
    the central management and control equipment decrypts the transmitted dial number and user number, retrieves a public key of a second piece of switching equipment accommodating a data terminal of the called party corresponding to the decrypted dial number and a common key, which is used between the first and second pieces of switching equipment, encrypts the retrieved public key of the second piece of switching equipment and the common key, which is used between the first and second pieces of switching equipment by using a public key of the first piece of switching equipment, and second the encrypted public key and common key to the first piece of switching equipment via the separate network,
    the first piece of switching equipment decrypts the public key and common key sent from the central management and control equipment, encrypts the decrypted common key, which is used between the first and second pieces of switching equipment by using the public key of the second piece of switching equipment and sends the encrypted common key to the second piece of switching equipment via the public network, and
    the second piece of switching equipment decrypts the encrypted common key sent from the first piece of switching equipment by a private key of the second piece of switching equipment, so that the common key can be used to perform secure communication between the first and second pieces of switching equipment.

2. The network system providing secure communication services according to claim 1,
    wherein the separate network is a No. 7 common channel signaling network.

3. A method for providing secure communication services in a network system having a plurality of pieces of switching equipment, being connected to each other through a public network, and accommodating data terminals, and central management and control equipment connected to the plurality of pieces of switching equipment through a separate network different from the public network, the method comprising the steps of:
    in a database provided at the central management and control equipment, storing a plurality of sets of a public key and a private key, each assigned to a piece of switching equipment;
    from a first piece of switching equipment accommodating a data terminal of a calling party, encrypting a dial number of a called party and a user number of the first piece of switching equipment by using a public key, which is used between the first piece of switching equipment and the central management and control equipment, and transmitting the encrypted dial number and user number to the central management and control equipment via the separate network;
    in the central management and control equipment, decrypting the transmitted dial number and user number, retrieving a public key of a second piece of switching equipment accommodating a data terminal of the called party corresponding to the decrypted dial number and a common key, which is used between the first and second pieces of switching equipment, encrypting the retrieved public key of the second piece of switching equipment and the common key, which is used between the first and second pieces of switching equipment by using a public key of the first piece of switching equipment, and sending the encrypted public key and common key to the first piece of switching equipment;
    by the first piece of switching equipment, decrypting the public key and common key sent from the central management and control equipment, encrypting the decrypted common key, which is used between the first and second pieces of switching equipment by using the public key of the second piece of switching equipment, and sending the encrypted common key to the second piece of switching equipment via the public network; and
    by the second piece of switching equipment, decrypting the encrypted common key sent from the first piece of switching equipment by a private key of the second piece of switching equipment, so that the common key can be used to perform secure communication between the first and second pieces of switching equipment.

4. The method for providing secure communication services according to claim 3,
    wherein the separate network is a No. 7 common channel signaling network.

* * * * *